UNITED STATES PATENT OFFICE.

ALBERT HERRMANN, OF HÖCHST-ON-THE-MAIN, GERMANY, ASSIGNOR TO THE FARBWERKE, VORMALS MEISTER, LUCIUS & BRÜNING, OF SAME PLACE.

BLUE ACID DYE.

SPECIFICATION forming part of Letters Patent No. 580,188, dated April 6, 1897.

Application filed January 14, 1897. Serial No. 619,219. (Specimens.)

*To all whom it may concern:*

Be it known that I, ALBERT HERRMANN, a citizen of the Empire of Germany, residing at Höchst-on-the-Main, Germany, have invented a new and useful Improvement in the Manufacture of a Blue Acid Dyestuff, of which the following is a specification.

I have found that by oxidation of the disulfonic acid of monobenzyltetraälkyltriamidodiphenyl-orthotolylmethane having the formula

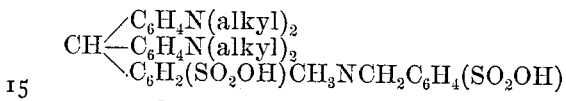

a very valuable dyestuff, namely, the disulfonic acid of monobenzyltetraälkyltriamidodiphenyl-orthotolylcarbinol, may be obtained. This disulfonic acid is produced by the condensation of tetraälkyldiamidobenzhydrol with monobenzyl-orthotoluidin disulfonic acid.

Twenty-seven kilograms of tetramethyldiamidobenzhydrol or the equivalent quantity of tetraethyldiamidobenzhydrol are dissolved in thirty-five kilograms of hydrochloric acid containing thirty-one per cent. HCl. This solution is mixed with a solution of 39.8 kilograms of the calcium salt of monobenzyl-orthotoluidin disulfonic acid and heated on the water-bath for from eight to ten hours till the hydrol has entirely disappeared. The product of the reaction is made alkaline with soda, filtered, and the leucosalt salted out from the filtrate. Ten kilograms of this leuco compound, being the sulfonic acid of monobenzyltetraälkyltriamidodiphenyl-orthotolylmethane, are dissolved in three hundred liters of water, the solution heated to 70° centigrade and oxidized with the calculated quantity of acetic acid and lead peroxid. The lead is precipitated with Glauber's salt and the filtered solution of the dyestuff is evaporated or the dyestuff salted out.

The new dyestuff may easily be obtained by crystallizing from water, forming a copper-red powder of metallic luster, easily soluble in water, less soluble in alcohol. The aqueous solution is blue, which on addition of mineral acids turns green. Soda and ammonia do not change the color. On boiling with soda-lye the solution turns violet.

The dyestuff dyes wool and silk blue in an acid-bath and is absorbed more completely than the corresponding monosulfonic acid. The tints are very even and fast to the influence of water, soap, light, and air.

Having thus described my invention, what I claim is—

1. The process herein described of producing a blue acid dyestuff, which consists in condensing tetraälkyldiamidobenzhydrol with monobenzyl-orthotoluidin disulfonic acid, and then oxidizing the thus-obtained sulfonic acid of monobenzyltetraälkyltriamidodiphenyl-orthotolylmethane, substantially as set forth.

2. As a new product, the blue dyestuff, namely the disulfonic acid of monobenzyltetraälkyltriamidodiphenyl-orthotolylcarbinol, being a copper-red powder of metallic luster, easily soluble in water, less easily soluble in alcohol, its aqueous solution turning green with mineral acids, but not changing its color with ammonia or soda, turning violet on boiling with soda-lye, and dyeing wool and silk a very even and fast blue in an acid-bath, substantially as set forth.

In testimony that I claim the foregoing as my invention I have signed my name in presence of two subscribing witnesses.

ALBERT HERRMANN.

Witnesses:
 HEINRICH HAHN,
 ALFRED BRISBOIS.